G. W. SAWIN.
Cultivator.
No. 67,917.
Patented Aug. 20, 1867.
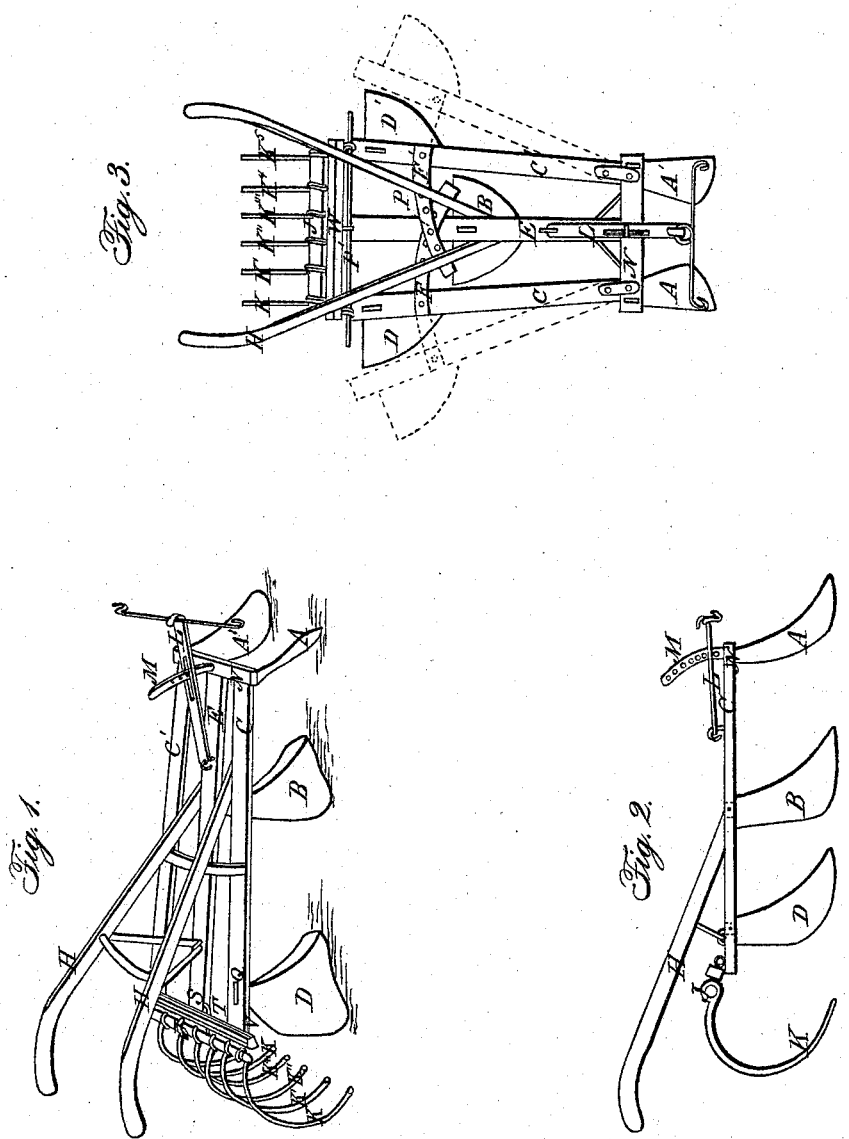
Witnesses:
A. Hun Berry
Frank G Parker
Inventor:
George W Sawin

United States Patent Office.

GEORGE W. SAWIN, OF NASHUA, NEW HAMPSHIRE.

Letters Patent No. 67,917, dated August 20, 1867.

---

HORSE-HOES.

---

*The Schedule referred to in these Letters Patent and making part of the same.*

---

TO ALL WHOM IT MAY CONCERN:

Be it known that I, GEORGE W. SAWIN, of Nashua, in the county of Hillsboro, and State of New Hampshire, have invented an improved Horse-Hoe; and I do hereby declare that the following is a full and exact description thereof, reference being had to the accompanying drawings, and to the letters of reference marked thereon.

The nature of my invention consists in constructing in a peculiar manner a cultivator or horse-hoe, and attaching to the rear of the same a rake which shall collect the weeds and grass which are thrown out by the blades of the cultivator. The method of attaching the rake to the cultivator is such that the rake may be thrown up on to the body of the hoe when it is not desirable to have it work.

To enable others skilled in the art to make and use my invention, I will proceed to describe its construction and use.

*Drawings.*

Figure 1 is a perspective view of my horse-hoe.
Figure 2 is an elevation, and
Figure 3 is a plan of the same.

I construct my improved horse-hoe as follows: E, figs. 1 and 3, represents a central bar, to which is rigidly attached the head-bar N. To this bar N two longitudinal bars, C and C', are attached by hinged joints, fig. 3. Fastened to the side bars C C', near their rear ends, are two arcs, F F', fig. 3, made of plate iron. These arcs are perforated, as shown, in such a manner that a pin, P, fig. 3, when inserted into them and into the centre bar E, will hold them and the side bars rigidly in position. The side bars C and C' may be opened so as to assume the position shown by the dotted lines in fig. 3. Attached to the head-bar N are two blades, A and A', formed as shown in the drawings. To the centre bar E, the blade B, and to the side bars C and C', the blades D and D' are attached. To the centre bar E two suitable handles H and H' are fastened for the purpose of guiding the horse-hoe. To the rear end of the horse-hoe a rake, J K, is secured by means of a bolt, P', fig. 3, which passes through eye-bolts inserted into the rake-head W, and the bars C, E, and C', as shown in fig. 3. This rake may be turned down, as shown in the drawings, and secured by means of the hook T holding in the staple S, fig. 1, or the rake may be turned on to the body of the hoe and become inoperative, or, by slipping out the bolt P' may be detached entirely from the other parts of the implement. The bar L, to which the whiffle-tree is attached, may be elevated or depressed at will, and held in position by means of the arc M and a small pin, shown in fig. 1. The blades A, A', B, D, and D', are attached to the body of the hoe by shanks Q and pins V, fig. 1, so that any number of them may be removed and the remainder left in position to work.

When it is desirable to use this hoe to soften the earth and weed out between the rows, all the blades and the rake may be left in position, as shown in fig. 3. When used in this manner it will soften the ground and collect the weeds.

When it is desirable to use my horse-hoe to "hill up" rows of vegetables, the blade B and the rake J K should be removed, then the hoe is held in such position that the row of vegetables shall be between the blades A and A', in which case these blades will hill up the earth on either side of the vegetables, while the blades D and D' loosen the earth on either side.

Having thus described my invention, I will now proceed to set forth my claim.

What I claim as my invention, and desire to secure by Letters Patent of the United States, is—

1. The combination as well as the arrangement of the rake J with the blades D, D', B, A, and A', made substantially as described and for the purpose set forth.

2. The combination and arrangements of the gathering-in blades A A' with the blades D and D', made substantially as described and for the purpose set forth.

3. The combination of the movable blade B with the adjustable bars C and C', made substantially as described and for the purpose set forth.

GEORGE W. SAWIN.

Witnesses:
WILLIAM EDSON,
A. HUN BERRY.